No. 624,588. Patented May 9, 1899.
J. WEIDNER.
DEVICE FOR PINCHING IN PARTS OF VESSELS.
(Application filed Feb. 23, 1899.)
(No Model.)
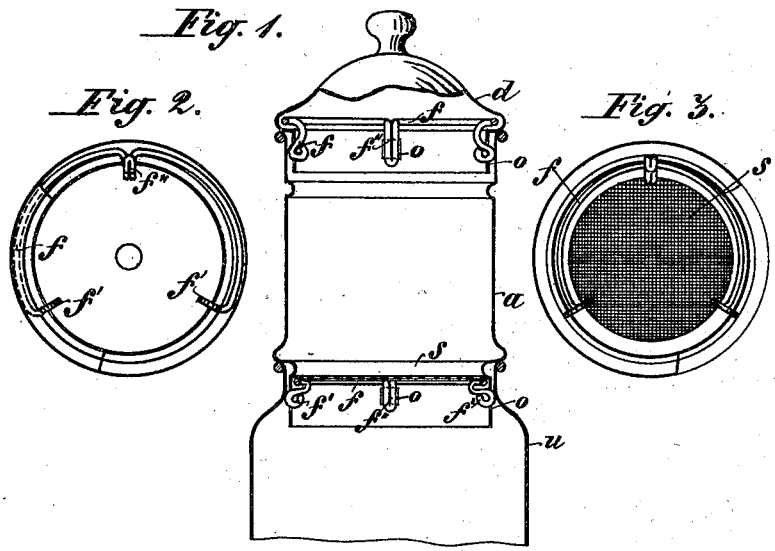
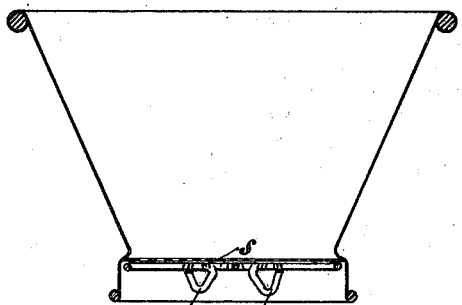
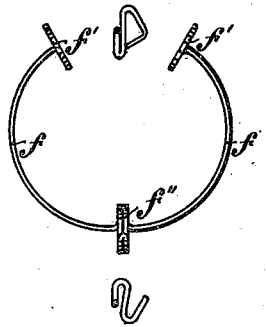
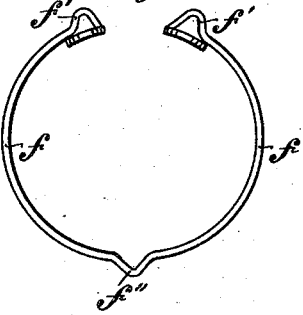
Witnesses:
William Miller.
William Schulz.
Inventor:
Johann Weidner
by his attorneys
Roeder & Brieren

UNITED STATES PATENT OFFICE.

JOHANN WEIDNER, OF AMBERG, GERMANY, ASSIGNOR TO GEBRÜDER BAUMANN FIRMA JOH. BAUMANN'S WWE., OF SAME PLACE.

DEVICE FOR PINCHING IN PARTS OF VESSELS.

SPECIFICATION forming part of Letters Patent No. 624,588, dated May 9, 1899.

Application filed February 23, 1899. Serial No. 706,499. (No model.)

*To all whom it may concern:*

Be it known that I, JOHANN WEIDNER, a subject of the King of Bavaria, residing at Amberg, in the Kingdom of Bavaria, Germany, have invented new and useful improvements in devices for pinching in parts of vessels, such as covers, head-pieces, bottoms of sieves, or intermediate bottoms into vessels, (for which I have applied for a patent in Germany and which application is dated December 31, 1898,) of which the following is a specification.

This invention relates to an improved device for connecting the parts of vessels with one another by means of a ring carrying hooks that project through openings in the inner section and impinge against the outer section.

In the accompanying drawings, Figure 1 is a vertical section of the upper part of a coffee-pot embodying the invention; Fig. 2, an inverted plan, partly in section, of the upper part of the same; Fig. 3, an inverted plan, partly in section, of the lower part of the same; Fig. 4, a vertical section of a colander embodying the invention; Fig. 5, a plan and details of the ring *f*, and Fig. 6 a plan of a modification of the ring.

The device consists, as shown in the accompanying drawings, of an annular wire spring *f*, (see Fig. 5,) provided in the middle and on the two ends with hooks *f'* and *f'''*, engaging into lateral openings *o*, arranged in the walls of the parts of the vessel and projecting here inwardly and outwardly. The parts of the hooks projecting from within outwardly serve to hold fast in vessel's covers *d* or head-pieces *a*, while the parts of the hooks projecting inwardly serve at the same time to pinch in and to carry bottoms of sieves or intermediate bottoms loosely put in.

In the accompanying drawings the device is applied to the upper part of a coffee-machine represented in Figs. 1, 2, and 3, first, for holding fast the cover *d*, (see upper part of Fig. 1, where the cover *d* is held fast by the spring *f* in the head-piece *a*;) second, for holding fast the piece *a* in the lower part *u*, (see lower part of Fig. 1, where the head-piece *a* is held fast in the coffee-pot *u*,) and at the same time, third, for pinching in and for carrying the sieve *s* in the lower end of the head-piece *a*.

To put the device in place, the middle hook *f''* of the spring *f* is hooked into the aperture *o*, arranged in the wall of the part of the vessel, whereupon the two end hooks *f'* may easily be passed one after the other into the corresponding holes from inside outwardly.

This device is of particular value for enameled parts of vessels. The diameter of the several parts of vessels forming altogether one whole—such as the cover *d*, the head-piece *a*, and the pot *u* of the illustrated coffee-machine—is not always exactly the same; also, the thickness of the enamel layers is different. In such cases the shape of the vessel warps in the fire, so that in the manufacture a certain play of the diameter of the several parts is to be taken into consideration. The parts belonging to each other fit, therefore, for the most part only loosely to each other, where a tight joining would be of great advantage.

By the device above described the several parts are firmly held together in a very simple manner.

Fig. 4 shows a sieve the bottom of which is held fast by a wire spring, such as represented in Fig. 6. This wire spring differs from the spring illustrated in Fig. 5 only by the form of the hooks *f'* and *f'''*.

I claim—

A device for pinching in parts of vessels, such as covers, head-pieces, bottoms of sieves or intermediate bottoms into vessels consisting in the arrangement of annular wire springs *f* having hooks *f' f'''* bent on and engaging into lateral openings *o* provided in the walls of the parts of the vessels substantially as above described and shown in the accompanying drawings.

In witness whereof I have hereunto signed my name in the presence of two subscribing witnesses.

JOHANN WEIDNER.

Witnesses:
 OSCAR BOCK,
 JOSEF MAYERHOFER.